United States Patent [19]

Samish et al.

[11] Patent Number: 4,755,282

[45] Date of Patent: Jul. 5, 1988

[54] PROCESS FOR THE REDUCTION OF $NH_3$ IN REGENERATION ZONE OFF GAS BY SELECT RECYCLE OF CERTAIN-SIZED $NH_3$ DECOMPOSITION CATALYSTS

[75] Inventors: Norman C. Samish, Houston; John E. Gwyn, Katy, both of Tex.

[73] Assignee: Shell Oil Company, Houston, Tex.

[21] Appl. No.: 76,470

[22] Filed: Jul. 22, 1987

[51] Int. Cl.[4] .................. C106 11/18; B01J 8/02
[52] U.S. Cl. ........................... 208/113; 55/70;
 208/153; 208/161; 208/164; 423/237; 423/239;
 502/41; 502/43
[58] Field of Search ............... 208/113, 120, 153, 161,
 208/164; 423/235, 237, 239; 502/52, 39, 41, 43;
 55/70

[56] References Cited

U.S. PATENT DOCUMENTS

| | | | |
|---|---|---|---|
| 3,058,906 | 10/1962 | Stine et al. | 208/111 |
| 3,467,491 | 9/1969 | Hardison | 423/237 |
| 4,081,508 | 3/1978 | Luckenbach | 423/210 |
| 4,115,250 | 9/1978 | Flanders et al. | 208/120 |
| 4,115,251 | 9/1978 | Flanders et al. | 208/120 |
| 4,153,535 | 5/1979 | Vasalos et al. | 208/120 |
| 4,204,944 | 5/1980 | Flanders et al. | 208/120 |
| 4,204,945 | 5/1980 | Flanders et al. | 208/120 |
| 4,221,677 | 9/1980 | Vasalos et al. | 252/455 |
| 4,238,317 | 12/1980 | Vasalos et al. | 208/120 |
| 4,290,878 | 9/1981 | Blanton, Jr. | 208/120 |
| 4,354,923 | 10/1982 | Myers et al. | 502/52 |
| 4,368,057 | 1/1983 | Matthews | 48/197 R |
| 4,412,914 | 11/1983 | Hettinger et al. | 502/52 |
| 4,425,259 | 1/1984 | Hettinger et al. | 502/74 |
| 4,427,536 | 1/1984 | Klaassen et al. | 208/113 |
| 4,434,147 | 2/1984 | Dimpfl et al. | 208/113 |
| 4,435,282 | 3/1984 | Bertolacini et al. | 208/113 |
| 4,438,082 | 3/1984 | Dettling et al. | 423/237 |
| 4,521,389 | 6/1985 | Blanton et al. | 208/120 |
| 4,613,428 | 9/1986 | Edison | 208/120 |

*Primary Examiner*—Anthony McFarlane
*Attorney, Agent, or Firm*—Kimbley L. Muller

[57] ABSTRACT

This process discloses a reduction in the content of ammonia in a regeneration zone off gas of a fluid catalytic cracking unit by the select recycle of certain sized ammonia decomposition catalyst particles. The ammonia decomposition may be aided by injection of $NO_x$ into the off gas. The particles are acquired from a separation means through which is passed the regeneration zone off gas. A solid-free regeneration zone off gas and a stream of solid particles, including a noble metal dispersed on an inorganic support, having a size of from 10 to 40 microns, are acquired. The latter segregated particles are then injected into the regeneration zone at a predetermined make-up rate to insure a very short residence time in the dense phase of the regeneration zone and to provide a relatively constant concentration of the $NH_3$ decomposition catalyst in the dilute phase of the regeneration zone to convert $NH_3$ to $N_2$ and water vapor. The regeneration zone is operated in a partial combustion mode defined by a CO content of from 1 to 6 percent by volume.

23 Claims, 1 Drawing Sheet

PROCESS FOR THE REDUCTION OF NH₃ IN REGENERATION ZONE OFF GAS BY SELECT RECYCLE OF CERTAIN-SIZED NH₃ DECOMPOSITION CATALYSTS

FIELD OF THE INVENTION

This application relates to a fluid catalytic cracking (FCC) process where nitrogen oxide ($NO_x$) levels in the flue gas are reduced after passage of the flue gas through a CO boiler or combustion zone and optionally an electrostatic precipitator before passage to the environment through a stack or chimney.

With the advent of modern FCC cracking catalysts, such as crystalline aluminosilicate zeolites, attempts have been made to reduce the coke content of regenerated FCC catalyst to a very low level, i.e., below 0.2 weight percent. In order to insure complete combustion of the coke on the catalyst to carbon monoxide, and then to carbon dioxide during regeneration, a CO combustion promoter has been added to FCC regeneration systems. These promoters, such as platinum, have been employed on the FCC catalyst, per se, or in a small amount on particulate solids mixed with the cracking system. Use of these promoters usually results in a CO content of less than 1 percent by volume in the regenerator off gas, also referred to as regenerator effluent or flue gas.

This invention is concerned with the control of ammonia content in an FCC regenerator off gas. This invention is a means to provide for compliance with strict air pollution standards, especially in California, without resort to a large increase in capital expenditure or to the addition of components harmful to the catalyst or the hydrocarbonaceous product derived from an FCC process.

BACKGROUND OF THE INVENTION

Older, more established FCC catalyst regeneration techniques are operated in an incomplete mode of combustion. This invention is concerned with such modes of operation. These systems are usually referred to as "standard regeneration" wherein a relatively large amount of coke is left on the regenerated catalyst which is passed from an FCC regeneration zone to an FCC reaction zone. The content of CO in the regeneration zone is relatively high, i.e., 1 to 6 volume percent. The concentration of carbon is approximately 0.25 to 0.45 weight percent carbon on the regenerated catalyst. In U.S. Pat. No. 4,435,282, issued to Bertolacini et al, a system for substantially complete combustion of coke on an FCC molecular sieve catalyst is disclosed. In the regenerator, hydrocarbon conversion catalyst particles are associated with particles of a platinum group metal, an oxidation catalyst, which promotes the combustion of carbon monoxide to carbon dioxide. The gaseous effluent from such a regeneration run in a "full combustion mode" has a low CO content and a high content of carbon dioxide. The catalyst particles in an FCC process are finely divided particulate solids having a size of between 20 microns and 150 microns to insure adequate fluidization. U.S. Pat. Nos. 4,153,535, 4,221,667, and 4,238,371 issued to Vasalos et al concern the operation of a cyclic, fluidized, catalytic cracking process with a reduction in the emission of CO and $SO_x$. A metallic promoter is incorporated into a molecular sieve-type cracking catalyst such that a stable sulfur-containing compound forms on the solid particles in the regeneration zone and a sulfur-containing gas is then withdrawn in a downstream sulfur stripping zone.

Nitrogen sensitivity of a hydrocracking catalyst has been found to be negated by introducing into the hydrocracking zone a halogen-containing compound and water with the hydrocarbonaceous feed. See Stine et al, U.S. Pat. No. 3,058,906. A number of U.S. patents issued to Chevron in the late 1970's and early 1980's concern catalytic conversion of nitrogen oxides to thereby control the nitrogen oxide levels in a flue gas generated by a catalyst regenerator.

In U.S. Pat. No. 4,204,945, a process is disclosed for removal of carbon monoxide and sulfur oxides from a flue gas of a catalyst regenerator of an FCC system. Sufficient molecular oxygen is introduced into the catalyst regenerator to provide an atmosphere having a molecular oxygen concentration of at least 0.1 volume percent. A particular carbon monoxide combustion promoter is physically admixed with the cracking catalyst to provide for total consumption of the coke to $CO_2$. Sulfur oxides in the regenerator off gas are contacted with a silica-free alumina to form a sulfur-containing solid on the catalyst and thereafter hydrogen sulfide in the cracking reactor. In U.S. Pat. No. 4,204,944 issued to the same patentees, Flanders et al, a process is provided for an FCC unit having a non-zeolitic crystalline refractory inorganic oxide catalyst. The amount of carbon monoxide and sulfur oxides in the regenerator flue gas is reduced by reacting carbon monoxide and oxygen to carbon dioxide in the presence of a carbon monoxide oxidation promoter, inclusive of platinum. Sulfur and an alumina-containing solid are present wherein sulfur trioxide is reacted with alumina and thereafter hydrogen sulfide is formed in the cracking zone by contact of the sulfur and alumina-containing solid with the hydrocarbon feed stream. Similar techniques are provided in U.S. Pat. Nos. 4,115,250 and 4,115,251, Flanders et al, for the reduction of pollution emissions using an alumina-containing catalyst in association with a CO oxidation promoter.

$NO_x$ is controlled in the presence of a platinium-promoted complete combustion regenerator in U.S. Pat. No. 4,290,878, issued to Blanton. Recognition is made of the fact that the CO oxidation promoters result in a flue gas having an increased content of nitrogen oxides. These nitrogen oxides are reduced or suppressed by using, in addition to the platinum CO oxidation promoter, iridium or rhodium. U.S. Pat. No. 4,368,057 teaches the removal of $NH_3$ contaminants of gaseous fuel by reacting the $NH_3$ with a sufficient amount of NO. This prior art has failed to appreciate a system whereby $NO_x$ is reduced by the control of ammonia in an incomplete combustion regenerator.

OBJECTS AND EMBODIMENTS

It is an object of this invention to provide for a reduced content of $NO_x$ in a fluid catalytic cracking regenerator off gas by the reduction of ammonia (($NH_3$) being emitted from the regenerator.

Another object of this invention is to provide for the reduction of nitrogen oxides in a fluidized catalytic cracking process, utilizing specific sized ammonia decomposition particles having a size of from 10 to 40 microns.

Another object of this invention is to provide for the reduction of ammonia in an effluent stream passed from an FCC regenerator to a CO boiler, whereby as CO is oxidized to $CO_2$ a lesser amount of ammonia will be oxidized to $NO_x$.

Another object of this invention is to provide for recycle of certain sized particles comprising an $NH_3$ decomposition promoter or catalyst to an FCC regenerator which is operated in a partial combustion mode to provide for a requisite content of the decomposition promoter or catalyst in the dilute phase of the FCC regenerator and thereby enhance the decomposition catalyst of ammonia to nitrogen and hydrogen.

Another object of this invention is to provide for the reduction of ammonia in an effluent stream passed from an FCC regenerator a CO boiler, where $NO_x$-producing substances are injected into the effluent stream, in a concentration about equal to or less than that of the ammonia, thus allowing the reaction of the ammonia and $NO_x$ aided by an ammonia decomposition catalyst. This catalytic reduction of $NO_x$ by ammonia is well known, and has the overall stoichiometry $4 NO + 4 NH_3 + O_2 \rightarrow 4 N_2 + 6 H_2O$, and $6 NO_2 + 8 NH_3 \rightarrow 7 N_2 + 12 H_2O$.

An embodiment of this invention resides in a process for reducing $NO_x$ emissions during the cracking of hydrocarbons and catalyst regeneration wherein said inventory is recycled between a hydrocarbon cracking zone and a catalyst regeneration zone operated in a partial oxygen combustion mode as defined by having from about 1 to about 6 percent by volume CO content, wherein regeneration off gas is formed by burning coke off spent catalyst particles in the presence of a molecular oxygen-containing gas at regeneration conditions in said regeneration zone, where during said combustion, carbon dioxide, carbon monoxide, ammonia and $NO_x$ are formed and where an ammonia decomposition promoter comprising a metal or compound of a metal is associated with solid particles in the catalyst inventory, wherein said metal or compound of metal associated with said solid particles is withdrawn from said regenerator and passed with said regeneration off gas to a separation means, wherein said solid particles are separated in a manner sufficient to form a stream of an ammonia decomposition promoter or catalyst having a particle size of from 10 to 40 microns and recycling said separated select sized solid particles to said regeneration zone or to said regeneration off gas.

Another embodiment of this invention is as described in the previous embodiment, except $NO_x$ or $NO_x$-producing compounds are injected into the regenerator off gas so that the off gas contains about as much or less $NO_x$ than ammonia.

BRIEF DESCRIPTION OF THE INVENTION

This invention is concerned with reduction of ammonia ($NH_3$) in the off gas derived from a fluid catalytic cracking regeneration zone by passing a select sized ammonia decomposition catalyst to either the regeneration zone, per se, or to admixture with the off gas from the regeneration zone. The regeneration zone off gas may have $NO_x$ or $NO_x$-producing compounds added to aid the ammonia destruction. It has been found that the ammonia decomposition catalyst is supported on intermediate sized particles of from 10 to 40 microns and preferably from 15 to 25 microns. If these particular sized particles are injected into the recycle loop of particles returning to the regeneration zone at a predetermined make-up rate, the residence time of the solid decomposition particles relative to the larger cracking catalyst particles will be short in the dense bed due to rapid elutriation and long in the dispersed phase due to recycling by capture in and return from the primary and secondary regenerator cyclones. Therefore, combustion of CO to $CO_2$ in the dense bed will be diminished and decomposition of ammonia in the dispersed phase will be enhanced.

DETAILED DESCRIPTION OF THE INVENTION

The present invention is concerned with a fluidized catalytic cracking (FCC) system to process petrochemical feedstocks. Suitable feedstocks include petroleum distillates or residuals of crude oils which, when catalytically cracked, provide either a gasoline or a gas oil product. Synthetic feeds having boiling points of 400° F. to 1000° F., such as oil from coal or shale oil, can also be included.

The catalytic cracking of these relatively high molecular weight hydrocarbonaceous products results in the production of a hydrocarbonaceous product of lower molecular weight. Cracking is performed in a catalytic cracking reactor in cyclical communication with a catalyst regeneration zone, commonly called a "regenerator". The catalysts utilized in this type of system include siliceous inorganic oxides, such as silica alumina, or zeolite-containing cracking catalysts, including crystalline aluminosilicate zeolites associated with a porous refractory matrix, such as clay or the like. Zeolites suitable for these types of systems include an X type zeolite or a Y type zeolite having a low sodium content.

Cracking conditions employed during the conversion of higher molecular weight hydrocarbons to lower molecular weight hydrocarbons include a temperature of 600° F. to about 1050° F. A catalyst to hydrocarbon weight ratio of about 3 to 10 and a weight hourly space velocity of about 5 to 200 per hour is contemplated for the hydrocarbonaceous conversion. The average amount of coke deposited on the surface of the catalyst is between 0.5 weight percent and 2.5 weight percent depending on the content of the feed. Rapid disengagement of the hydrocarbons from the catalyst is accomplished in a quick-stripping zone either intrinsic within the reactor or located in an external vessel. This stripping function is performed in the presence of steam or another inert gas at a temperature of about 750° F. to about 1150° F.

The catalyst regeneration zone of an FCC process includes a lower dense bed of catalyst having a temperature of about 1050° F. to 1300° F. and a surmounted dilute phase of catalyst having a temperature of from about 1100° F. to 1350° F. In order to remove coke from the catalyst, oxygen is added to the regeneration zone. This is performed by a suitable sparging device in the bottom of the regeneration zone or, if desired, additional oxygen is added to the dilute phase of the regeneration zone. In this invention it is necessary to provide an under-stoichiometric quantity of oxygen to operate the regeneration zone in a partial combustion mode. The regeneration zone of this invention is operated in a partial combustion mode as defined by the content of CO in the regeneration zone of from 1 to 6 percent CO by volume. It is preferred that the quantity of coke on the catalyst be reduced to below 0.5 percent before return of the catalyst to the catalytic cracking zone. In some embodiments of the prior art, complete CO combustion to $CO_2$ is enhanced by the presence of a CO oxidation promoter selected from a platinum group metal either dispersed on the FCC catalyst or on a separate inorganic oxide in physical admixture with the cracking catalyst. In the instant invention, the presence of platinum on an inorganic oxide support may, in effect, provide some incentive to oxidize the CO to $CO_2$. However, it is desirable to select the particular type and size of noble metal dispersed upon an inorganic oxide such that the amount of CO conversion is minimized and the amount of $NH_3$ decomposition is maximized.

The decomposition catalyst of this invention is chosen from any metal of the noble group metals including platinum, palladium, iridium, rhodium, osmium, or ruthenium. The quantity of the noble metal and the ammonia decomposition catalyst dispersed on an inorganic support will be from about 100 to about 10,000 parts per million by weight. The particle size of the ammonia decomposition catalyst is very important to this invention. Usually, between 8 and 10 percent of the FCC catalyst and ammonia decomposition catalyst comprises 40 microns or less. The catalyst inventory will usually have a mean mass size of between 60 and 70 microns. Downstream of the regeneration zone, the solid particles and spent regeneration gas, comprising a small quantity of oxygen and carbon monoxide plus carbon dioxide, and nitrogen oxides are passed to a separation means. Preferably, the separation means comprises a series of cyclone separators wherein catalyst particles will drop out of the bottom of the cyclone separators while the regeneration gas will be discharged in the overhead of the cyclone separator. It is a preferred embodiment of this invention that the underflow of a third stage cyclone separator is constructed to acquire ammonia decomposition particles of a particle size of between 10 and 40 microns. It is preferred that the size is between 6 and 32 microns and most preferred that the size is between 5 and 20 microns. If necessary, a particular screening or sieving means can be utilized to treat the decomposition catalyst from the cyclone separation means to acquire this select particle size of the ammonia decomposition catalyst. After the regeneration off gas has been sufficiently separated from the solid particles in the separation means, it is passed through a turbine to recover any power indigenous to the regeneration zone off gas and then passed to a CO boiler wherein added oxygen is provided to oxidize CO to $CO_2$.

The CO boiler or combustion zone is operated with auxiliary fuel in order to insure complete conversion of CO to carbon dioxide. Either upstream or downstream of the CO boiler, an electrostatic precipitator is utilized to remove dust particles which are entrained in the regeneration off gas.

One problem with operating the regeneration zone in the standard mode or partial oxidation mode is that it is mandatory that CO be oxidized to $CO_2$ in a CO boiler before release to the atmosphere. If ammonia is present in the regeneration zone off gas passed to the CO boiler, much of it is often oxidized to $NO_x$, which is also a serious undesirable pollutant. In order to eliminate $NO_x$ from ammonia formation in the CO boiler, ammonia addition to the CO boiler is mitigated or eliminated. This is accomplished by adding to the particular fine-powdered catalyst, having a micron size of 10 to 40 microns, to the regeneration zone, or to the regeneration zone off gas as it exits to the regeneration zone. This decomposition catalyst aids the ammonia decomposition to nitrogen and water vapor. In addition, $NO_x$ may be injected into the off gas, where it will react with the ammonia, aided by the ammonia decomposition promoter.

The size of the ammonia decomposition promoter is very important as this determines the residence time in the dispersed phase of the regeneration zone. The particular sized decomposition promoter can be put in the dense or dilute phase via catalyst recycle and will remain in the regenerator for a sufficient time to cause ammonia to decompose. Undue CO to $CO_2$ conversion so as to change the mode of combustion of the regenerator from the partial combustion mode is avoided by injecting a substoichiometric amount of oxygen to the regenerator and by a low concentration of $NH_3$ decomposition promoter in the dense bed.

ILLUSTRATIVE EMBODIMENTS

Typically, an FCC reactor-regeneration system has a catalyst particle inventory with a broad-sized distribution having 8 to 10 percent of the particles of a size of less than 40 microns and a mass mean size of 60 to 70 microns. In an FCC unit processing 35,000 barrels per day of hydrocarbon feed and burning 29,000 pounds per hour of carbon on the catalyst, the regeneration zone off gas contains 20 to 30 tons per minute of catalyst which is passed to primary cyclones to recover the bulk of the catalyst. Secondary cyclones may recover the remaining entrainment, especially in the 30 to 40 micron range. Captured regeneration off gas from a second cyclone separator is passed to a third cyclone separator to recover the remaining solid particles. Only small quantities of ultrafines escape this last cyclone stage. The underflow of the third cyclone is carried in a blowdown of the regeneration off gas stream through a final separator which passes recovered catalyst into a hopper to recovery and return to the regeneration zone on the hydrocarbon reactor. In the recycle mode of operation, catalyst fines having a particle size of 10 to 40 microns in size, sufficient to decompose ammonia into nitrogen and water vapor, are recycled to the regeneration zone per se, or added to the off gas from the regeneration zone after their recapture. In both of these environments, there is a sufficient amount of oxygen to decompose ammonia to water vapor and nitrogen. It is conceivable that some make-up nitrogen decomposition catalyst comprising a noble metal or an inorganic oxide support will be required to enter this circulatory loop; however, small make-up rates can be economically incurred in light of the reduction in nitrogen oxide emissions leaving the stack of this process.

BRIEF DESCRIPTION OF THE DRAWING

Figure 1:
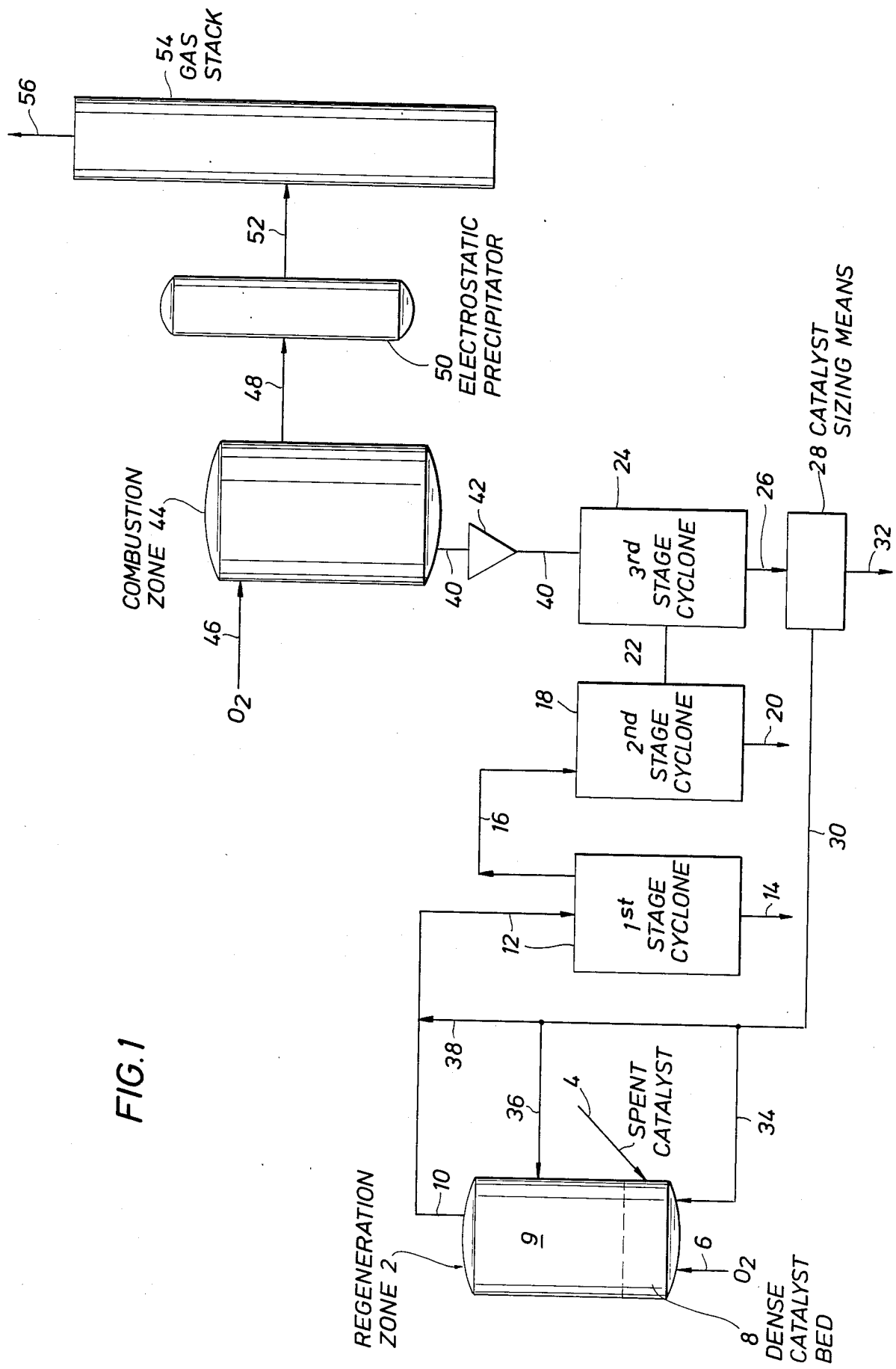
FIG. 1 is a flow scheme of the instant process of this invention showing the regeneration zone to the emissions stack of this process.

A regenerator 2 is provided for regeneration of spent catalyst received in conduit 4 communicating with a stripping section (not shown) of a fluid catalytic cracking reactor (also not shown). Oxygen is entered by means of conduit 6 in the bottom of the regeneration zone in which a dense bed of FCC catalyst continually undergoes regeneration. Located above the dense bed of catalyst is a dilute phase of catalyst 9. The dense phase of catalyst in the catalyst regeneration zone is maintained at a temperature of about 1050° F. to about 1300° F. while the dilute phase is maintained at a temperature of about 1100° F. to about 1350° F. In the regenerator, the content of CO is maintained at a level of from about 1 to about 6 percent by volume. This is the standard mode of incomplete combustion in which ammonia can reside and in which a sufficient amount of oxygen is available to convert ammonia to nitrogen and water vapor if a sufficient quantity of a ammonia decomposition catalyst is present at a residence time in the regeneration zone of from about 3 seconds to about 5 minutes. The temperature of the off gas of the regeneration zone in conduit 10 is from about 1100° F. to about 1350° F. Ammonia is selectively converted in conduit 10 and in dilute phase 9 to water vapor and nitrogen. The off gas is passed to a separation means 12 wherein solid catalyst particles are withdrawn via underflow 14 while the off gas stream continues to a secondary cyclone separation zone via conduit 16. The catalyst solids loadings in conduit 14 can be recycled to the regeneration zone or can be passed to the catalyst reaction zone for continuous conversion of the hydrocarbonaceous product. Second stage cyclone separator 18 functions to separate solids from regeneration zone off gas passed thereto from conduit 16. Underflow solids loading 20 is removed from the bottom of the second stage cyclone containing nearly all of the entrained catalyst from the regeneration off gas phase. If desired, cyclones 12 and 18 can be situated in dilute phase 9 and catalyst returned to the regenerator dense bed 8 by means of internal standpipes. Vapor phase 22 is withdrawn from the second stage cyclone comprising carbon monoxide, carbon dioxide, nitrogen and water vapor plus small sized catalyst fines and passed to third stage cyclone 24, which acts to separate nearly all of the solid catalyst particles from the gaseous material. Underflow of third stage cyclone separator 24 is removed in conduit 26 and contains catalyst particles comprising the $NH_3$ decomposition catalyst made up of a noble metal supported on an inorganic oxide in a size sufficient such that catalyst sizing means 28 provides a catalyst stream 30 of ammonia decomposition catalyst having a size of 10 to 40 microns. Unwanted catalysts can be withdrawn from catalyst sizing means 28 through conduit 32 and returned to the process or discharged as the refiner deems appropriate. It is conceivable that the 10 to 40 micron size ammonia decomposition catalyst in conduit 30 is passed to the regeneration zone into dense bed 8 by a means of conduit 34, into dilute phase 9 in conduit 36 or into regeneration zone off gas effluent 10 by means of conduit 38. The extent of this recycle can be contingent on the quantity of $NH_3$ entering the CO boiler or the quantity of $NO_x$ being generated in the CO boiler. It is also conceivable that all three points of recycle are utilized to pass the ammonia decomposition catalyst to the regeneration zone and thereby eliminate or mitigate the quantity of ammonia from the feed stream to the CO boiler.

The off gas from the third stage cyclone is removed in conduit 40 and optionally passed through expander 42 to recover any residual power indigenous to stream 40. The stream entering CO boiler 44 is substantially depleted of ammonia. For this reason the oxygen entered by means of conduit 46 will not convert excessive amounts of ammonia to harmful $NO_x$. In CO boiler 44, CO is converted essentially completely to $CO_2$. A $CO_2$ (a substantially CO-free and substantially $NO_x$-free) stream is withdrawn in conduit 48 and passed to electrostatic precipitator 50 for electrostatic removal of particles harmful to the environment. After passage through the electrostatic participator, an effluent stream 52 is withdrawn and passed to stack 54 from which the gas is emitted to the environment in a safe manner via stack conduit 56. The gas passed to the environment has a $NO_x$ content of less than 150 ppm by volume and a CO content of less than 500 ppm by volume. The above-described drawing is representative of the process of this invention and should not be construed as a limitation thereon.

What I claim as my invention is:

1. A process to reduce the content of ammonia in a fluid catalytic cracking regeneration zone off gas derived from a fluid catalytic cracking regeneration zone which comprises passing to said regeneration zone or to said regeneration zone off gas an ammonia decomposition catalyst comprising a noble metal supported on an inorganic oxide, wherein said catalyst is comprised of solid particles having a size of from about 10 to about 40 microns.

2. The process of claim 1 wherein said solid particles are passed to admixture only with said regeneration zone off gas.

3. The process of claim 1 wherein said noble metal is platinum, said inorganic oxide is alumina and said solid particle size ranges from 16 to 32 microns.

4. The process of claim 1 wherein said regeneration zone is operated in a partial mode of combustion defined by a CO content of from 1 to 6 percent by volume and wherein said noble metal catalyst decomposes ammonia to water vapor and nitrogen.

5. The process of claim 1 wherein a $NO_x$-producing precursor is added to said regeneration off gas in a concentration of about equal molar quantity based on the concentration of ammonia in said gas and wherein said $NO_x$ and said ammonia selectively react in the presence of said select sized decomposition catalyst to form water vapor and nitrogen.

6. The process of claim 1 wherein said regeneration zone off gas has a reduced content of ammonia and where such reduced content of ammonia mitigates the production of $NO_x$ when said regeneration zone off gas is passed to a CO boiler for oxidation of CO to $CO_2$.

7. The process of claim 1 wherein said noble metal inorganic oxide supported catalyst is sized to within the range which comprises 8 to 10 percent by weight of the total fluid catalyst inventory, said catalyst inventory having a mean mass size of 60 to 70 microns.

8. The process of claim 1 wherein said solid particles having a size of 10 to 40 microns are recovered from separation of said regeneration zone off gas comprising spent regeneration off gas and solid catalytic particles.

9. The process of claim 8 wherein said recovered solid particles are transferred to a size separation means to acquire said solid particles having a size of from 10 to 40 microns.

10. The process of claim 1 wherein said solid particles passed to said regeneration zone enter said regeneration zone by an inlet means situated in a dense bed of catalyst in a bottom portion of said regeneration zone or in a dilute phase of catalyst in a top portion of said regeneration zone.

11. A process for reducing $NO_x$ emissions during the cracking of hydrocarbons and catalyst regeneration comprising a cracking catalyst inventory of circulating solid particles including catalyst particles, wherein said catalyst inventory is recycled between a hydrocarbon cracking zone and a catalyst regeneration zone operated in a partial oxidation combustion mode as defined by a temperature of about 1050° F. to about 1300° F. and a CO content by volume of from about 1 to about 6 percent, wherein regeneration zone off gas is formed by burning coke off said catalyst particles in the presence of a molecular oxygen-containing gas at regeneration conditions in said regeneration zone, where during said coke-burning carbon dioxide, carbon monoxide, ammonia and $NO_x$ are formed and where an ammonia decomposition catalyst comprising a noble metal or compound of a noble metal is associated with solid particles and is present in the catalyst inventory, wherein said noble metal or compound of noble metal associated with said solid particles is withdrawn from said regeneration zone and passed with said regeneration off gas to a separation means, wherein said solid particles are separated in said separation means in a manner sufficient to form a stream of an ammonia decomposition promoter having a particle size of from 10 to 40 microns and recycling said separated select sized solid particles to said regeneration zone or to said regeneration zone off gas.

12. The process of claim 11 wherein said select sized solid particles passed to said regeneration zone are effective ammonia decomposition catalysts to decompose ammonia to $N_2$ and water vapor in the presence of an oxygen-containing gas.

13. The process of claim 11 wherein said select sized solids having a size of from 10 to 40 microns are recycled to admixture with regeneration zone off gas at a situs intermediate withdrawal of said regeneration zone off gas from said regeneration zone and passage of said regeneration zone off gas to said separation means.

14. The process of claim 11 wherein said ammonia decomposition catalyst comprises a noble metal dispersed on an alumina support and sized to within the range that comprises from 8 to 10 weight percent of said total catalyst inventory.

15. The process of claim 11 wherein said separation means comprises a series of cyclone separation zones constructed in a manner sufficient to arrive at said select sized ammonia decomposition catalyst of from 10 to 40 microns.

16. The process of claim 15 wherein said select size of ammonia decomposition catalyst is from 16 to 32 microns.

17. The process of claim 11 wherein said ammonia in said regenerator off gas is decomposed to nitrogen and water vapor in the presence of said select ammonia decomposition catalyst.

18. The process of claim 11 wherein a CO boiler is operated downstream of said regeneration zone in a manner effective to oxidize regeneration off gas and thereby pass process gas to the environment having a $NO_x$ content of less than 150 ppm by volume derivative of a reduction of ammonia added to said CO boiler and a content of less than 500 ppm CO by volume as a result of the oxidation of CO to $CO_2$ in the CO boiler.

19. In a process for the fluidized catalytic cracking of a higher molecular weight hydrocarbon to a lower molecular weight hydrocarbon which process comprises:

(a) contacting, in a cracking zone, said higher molecular weight hydrocarbon with a cracking catalyst, wherein said cracking catalyst becomes deactivated with coke deposits while being employed in said cracking;

(b) withdrawing deactivated cracking catalyst particles from said cracking zone having said coke deposited thereon and passing said coked catalyst to a regeneration zone containing an ammonia decomposition catalyst and an inlet means for admission to said regeneration zone of a sufficient quantity of an oxygen-containing gas to operate said regeneration zone in a mode of partial combustion as defined by the presence of from 1 to 6 volume percent of CO in the regeneration zone:

(c) contacting the coke-deposited cracking catalyst with said oxygen-containing gas in the presence of said ammonia decomposition catalyst comprising a noble metal dispersed on an alumina support to form a regeneration zone effluent stream comprising spent regeneration gas, regenerated catalyst, and ammonia decomposition catalyst;

(d) withdrawing said regeneration zone effluent stream from said regeneration zone and passing said regeneration zone effluent stream to a separation means wherein said spent regeneration gas, regenerated catalyst and ammonia decomposition catalyst are separated and wherein said spent regeneration gas is passed to a CO combustion zone;

(e) combusting said spent regeneration gas in said CO combustion zone in the presence of an oxygen-containing gas to form $CO_2$, hydrogen and water vapor; and (f) passing said $CO_2$, hydrogen and water vapor to ambient air as emissions from said process, with a reduced amount of $NO_x$ as a result of the improvement of said process which consists of separating said ammonia decomposition catalyst in step (d) from said regenerated catalyst and spent regeneration gas in said separation means to attain a stream containing said ammonia decomposition catalyst in a select size of from 10 to 40 microns and recycling said select sized ammonia decomposition catalyst either to (1) said regeneration zone or (2) said regeneration effluent stream intermediate to said regeneration zone and said CO combustion zone.

20. The process of claim 19 wherein said lower molecular weight hydrocarbon is a gasoline or a gas oil.

21. The process of claim 19 wherein said noble metal is selected from platinum, palladium, iridium, rhodium, ruthenium, osmium and combinations thereof.

22. The process of claim 19 wherein said separation means comprises a series of cyclone separators wherein said spent regeneration gas, regenerated catalyst and ammonia decomposition catalyst are separated and wherein said ammonia decomposition catalyst is passed to a second separation means to form said stream of solid particles having said select size of from 10 to 40 microns.

23. The process of claim 19 wherein said regeneration zone contains a preliminary separation means to separate a majority of said regenerated catalyst prior to said formation of said regeneration zone effluent stream.

* * * * *